(12) United States Patent
Cherubini et al.

(10) Patent No.: US 8,331,055 B2
(45) Date of Patent: Dec. 11, 2012

(54) CONTROL METHOD AND APPARATUS FOR A DUAL-CHANNEL WEIGHTED LPOS COMBINING SCHEME

(75) Inventors: Giovanni Cherubini, Rueschlikon (SZ); Robert Allen Hutchins, Tucson, AZ (US); Jens Jelitto, Rueschlikon (SK); Melanie Jean Sandberg, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/500,490

(22) Filed: Jul. 9, 2009

(65) Prior Publication Data
US 2011/0007413 A1    Jan. 13, 2011

(51) Int. Cl.
*G11B 21/02*    (2006.01)
(52) U.S. Cl. ........... 360/75; 360/49; 360/76; 360/77.12; 360/77.07
(58) Field of Classification Search .................. None
See application file for complete search history.

(56) References Cited

U.S. PATENT DOCUMENTS

| | | | |
|---|---|---|---|
| 5,448,430 A | 9/1995 | Bailey et al. | |
| 5,909,336 A * | 6/1999 | Schaffner et al. | 360/77.08 |
| 5,930,065 A * | 7/1999 | Albrecht et al. | 360/72.2 |
| 6,580,581 B1 | 6/2003 | Bui et al. | |
| 6,724,559 B1 * | 4/2004 | Konishi et al. | 360/76 |
| 6,724,561 B1 | 4/2004 | Wyman | |
| 6,791,781 B2 * | 9/2004 | Bui et al. | 360/72.2 |
| 6,906,887 B2 | 6/2005 | Nakao | |
| 6,937,413 B2 | 8/2005 | Bui et al. | |
| 6,987,633 B2 * | 1/2006 | Hutchins | 360/67 |
| 6,992,857 B2 * | 1/2006 | Knowles et al. | 360/77.12 |
| 7,130,140 B1 | 10/2006 | Boyer et al. | |
| 7,196,859 B2 * | 3/2007 | Olson | 360/29 |
| 7,245,450 B1 | 7/2007 | Cherubini et al. | |
| 7,605,992 B2 * | 10/2009 | Bui et al. | 360/49 |
| 7,839,599 B2 * | 11/2010 | Bui et al. | 360/77.12 |

(Continued)

FOREIGN PATENT DOCUMENTS

| DE | 69220280 | 1/1998 |
|---|---|---|
| EP | 1984919 | 8/2009 |

OTHER PUBLICATIONS

International Search Report and Written Opinion dated Aug. 6, 2010.
Wong, "Analog Servo Pattern for Rotating Head Tape Systems," TDB 06-74, Jun. 1974, p. 229.
Jaquette, "LTO: A better formal for mid-range tape," IBM J. Res. & Dev., Jul. 2, 2003, pp. 429-444, vol. 47.
Barrett et al., "Timing-Based Track-Followin Servo for Linear Tape System," IEEE Transactions on Magnetic, Jul. 4, 1998, pp. 1872-1877, vol. 34, No. 4.
Wong, "Analog Servo Pattern for Rotating Head Tape Systems," TDB 06-74, Jun. 1, 1974, p. 229.
German Office Action.

*Primary Examiner* — Dismery Mercedes
(74) *Attorney, Agent, or Firm* — Dale F. Regelman; Quarles & Brady LLP (57) ABSTRACT

A method for monitoring a plurality of servo channels, providing a finite state machine ("FSM") comprising a single servo channel mode and a combined servo channel mode, and moving a sequential information storage medium comprising a plurality of servo bands across a read/write head comprising a corresponding plurality of servo sensors. The method further asserts an acquisition flag by a servo channel if that servo channel is tracking a servo pattern, and asserts a bit flag by a servo channel if a new LPOS bit is decoded. If at least one acquisition flag is asserted, the method determines if a bit flag is asserted by a servo channel associated with said asserted acquisition flag, and if an acquisition flag and a bit flag are asserted by a servo channel, the method determines a relative positioning of each servo sensor with respect to an associated servo pattern.

21 Claims, 8 Drawing Sheets

U.S. PATENT DOCUMENTS

| | | | |
|---|---|---|---|
| 7,924,520 B2* | 4/2011 | Fasen | 360/39 |
| 7,982,988 B2 | 7/2011 | Bui et al. | |
| 7,990,644 B2* | 8/2011 | Bui et al. | 360/47 |
| 2003/0099059 A1 | 5/2003 | Nakao | |
| 2005/0030662 A1 | 2/2005 | Bui et al. | |
| 2005/0078398 A1 | 4/2005 | Hutchins | |
| 2006/0114596 A1 | 6/2006 | Eaton et al. | |
| 2008/0024904 A1* | 1/2008 | Cherubini et al. | 360/73.04 |
| 2008/0117539 A1* | 5/2008 | Bui et al. | 360/48 |
| 2010/0079905 A1* | 4/2010 | Fasen | 360/77.12 |

* cited by examiner

CONTROL METHOD AND APPARATUS FOR A DUAL-CHANNEL WEIGHTED LPOS COMBINING SCHEME

FIELD OF THE INVENTION

Applicants' invention relates generally to a method to monitor multiple servo channels, where a control scheme switches between a single servo channel mode and a combined servo channel mode.

BACKGROUND OF THE INVENTION

Timing-based servo ("TBS") is a technology developed for linear tape drives. In TBS systems, recorded servo patterns consist of transitions with two different azimuthal slopes. Lateral read/write head position is derived from the relative timing of detected pulses, or dibits, sensed by a plurality of servo sensors disposed on the read/write head. TBS patterns also allow the encoding of additional longitudinal position ("LPOS") information without affecting the generation of the transversal position error signals ("PES"). This is obtained by shifting transitions from their nominal pattern position using pulse-position modulation ("PPM"). A specification for the servo format in current midrange tape drives is provided by the linear tape-open ("LTO") format. The complete format for LTO drives of generation 1 (LTO-1) was standardized by the European Computer Manufacturers Association ("ECMA") in 2001 as ECMA-319.

In tape drives, two dedicated servo channels are normally available from which LPOS information and PES can be derived. A signal from one servo channel may occasionally fade while the other signal from the other servo channel might not be detected. In such an event, the servo channel affected by fading loses timing and needs to undergo re-acquisition. Consequently, additional latency and loss of information is experienced.

SUMMARY OF THE INVENTION

There is a need for a method to control servo channel combining operations based on the status of the individual servo channels and a timing relationship (skew) between the servo signals. In one embodiment, a method for monitoring a plurality of servo signals, where a control scheme switches between a single servo channel mode and a combined servo channel mode, is presented. Initially, a sequential information storage medium having multiple servo bands is moved past a read/write head having corresponding servo sensors. Next, the method detects whether one or more acquisition flags are asserted, where each asserted acquisition flag indicates that an associated servo channel is tracking a servo pattern. If at least one acquisition flag is asserted, the method detects whether a bit flag is asserted for the servo channel associated with the asserted acquisition flag, where each bit flag indicates the availability of a new LPOS bit. Finally, if at least one bit flag is asserted, a relative positioning for each servo sensor is determined with respect to an associated servo pattern.

In another embodiment an article of manufacture having a computer readable medium having computer readable program code disposed therein to monitor multiple servo signals, where a control scheme switches between a single servo channel mode and a combined servo channel mode, is presented. The computer readable program code includes a series of computer readable program steps to effect moving a sequential information storage medium having multiple servo bands past a read/write head having corresponding servo sensors, detecting if one or more acquisition flags are asserted, each asserted acquisition flag indicating that an associated servo channel is tracking a servo pattern, if at least one acquisition flag is asserted, detecting if a bit flag is asserted for the servo channel associated with the asserted acquisition flag, each bit flag indicating the availability of a new LPOS bit; and if at least one bit flag is asserted, determining a relative position for each of the servo sensors with respect to an associated servo pattern.

In yet another embodiment, a computer program product encoded in a computer readable medium and useable with a programmable computer processor to monitor a plurality of servo signals, where a control scheme switches between a single servo channel mode and a combined servo channel mode, is presented. The computer program product includes computer readable program code which causes the programmable processor to: move a sequential information storage medium having multiple servo bands past a read/write head having corresponding servo sensors, detect if one or more acquisition flags are asserted, each asserted acquisition flag indicating that an associated servo channel is tracking a servo pattern, if at least one acquisition flag is asserted, detect if a bit flag is asserted for the servo channel associated with the asserted acquisition flag, each bit flag indicating the availability of a new LPOS bit; and if at least one bit flag is asserted, determine a relative position for each of the servo sensors with respect to an associated servo pattern.

In yet another embodiment, a data storage device having multiple servo sensors and corresponding servo controllers is presented. Each servo controller includes an acquisition flag indicating the servo channel has acquired a servo pattern, a bit flag indicating the availability of a new LPOS bit, and a servo sensor position indicator ("SRPI") providing a position of a servo-reader within a servo frame.

In yet another embodiment, a data storage library having multiple data storage devices, each data storage device having multiple servo sensors and corresponding servo controllers is presented. Each servo controller includes an acquisition flag indicating the servo channel has acquired a servo pattern, a bit flag indicating the availability of a new LPOS bit, and a servo sensor position indicator ("SRPI") providing a position of a servo-reader within a servo frame.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
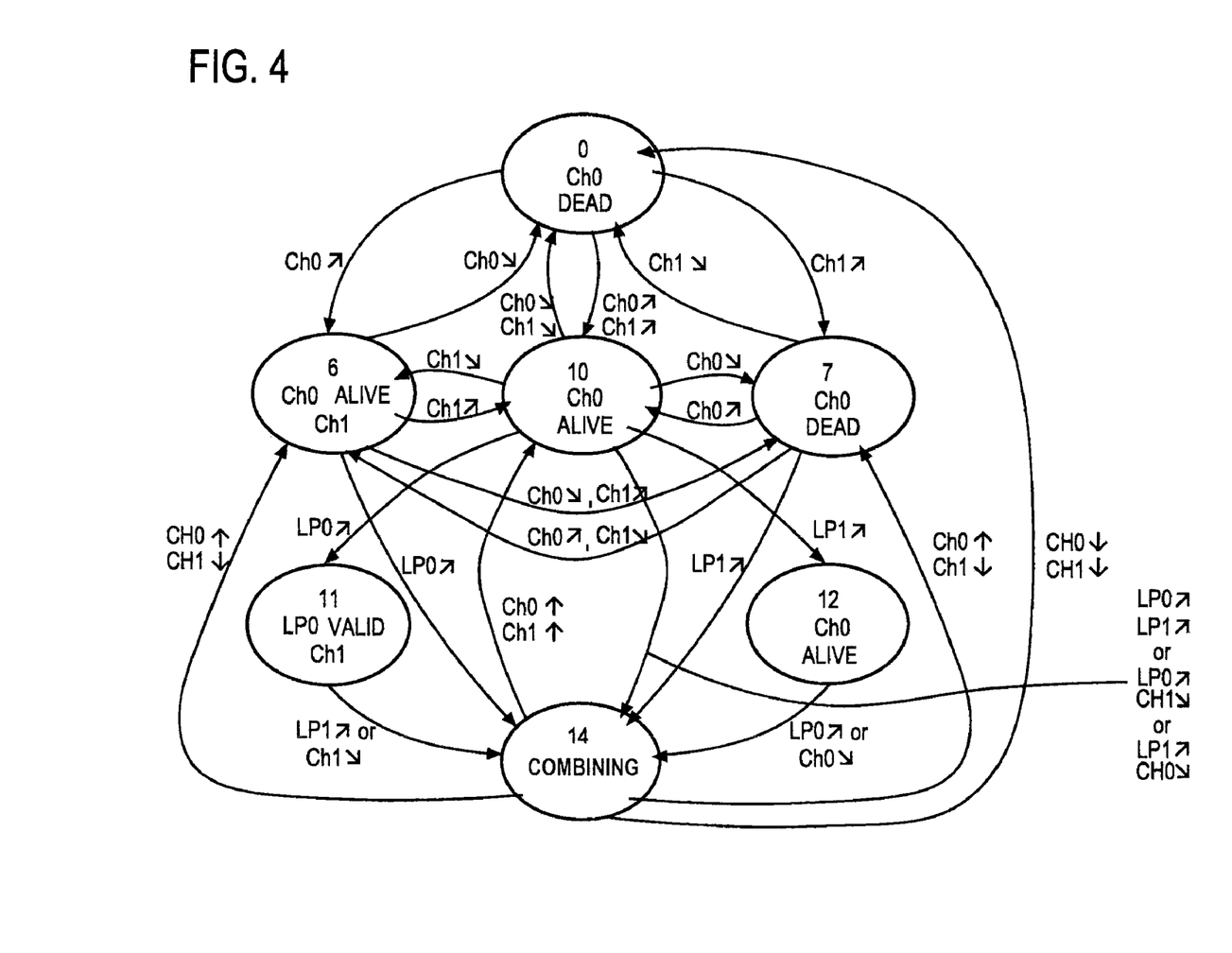
FIG. 4 a block diagram of one embodiment of Applicants' finite state machine.

FIG. 4 is set forth as logical flow diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
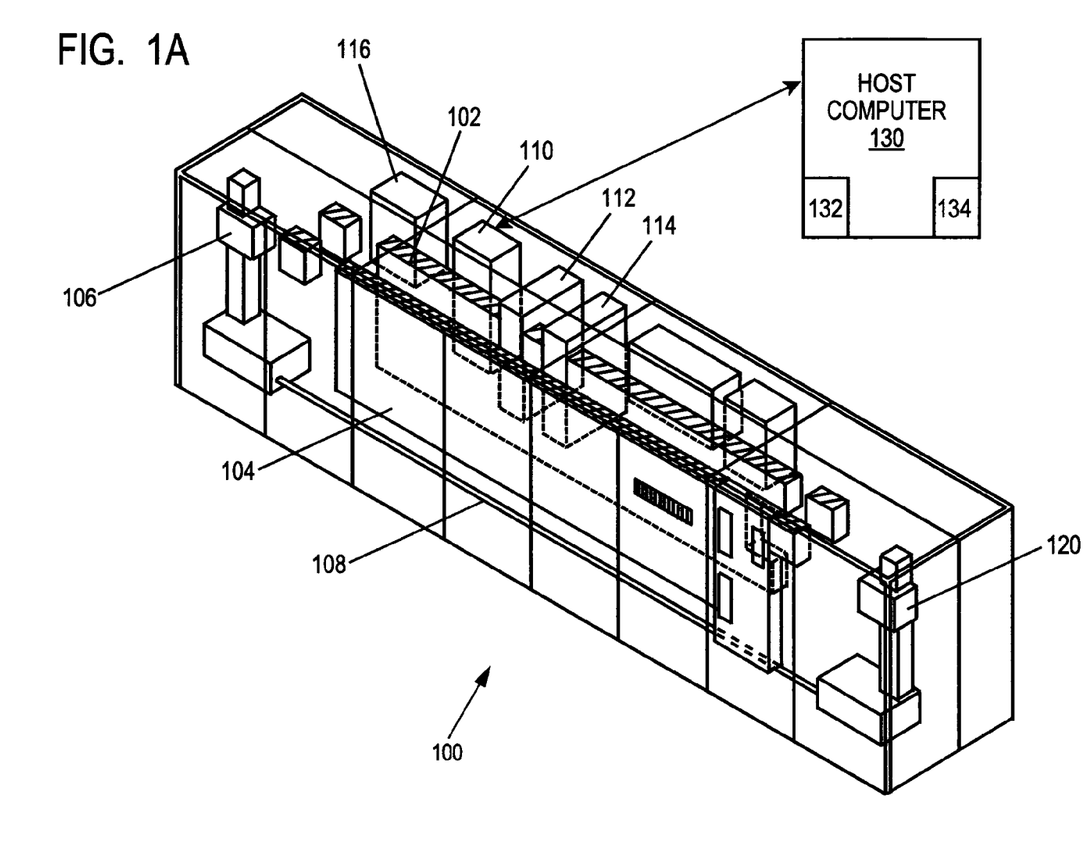
FIG. 1A illustrates one embodiment of Applicants' data storage system.

FIG. 1A shows data storage system 100 comprising storage controller 110, data storage devices 112 and 114, and DASD 116. System 100 further includes a plurality of sequential data storage media removeably disposed in a plurality of storage slots disposed in first storage wall 102 and/or second storage wall 104. System 100 also includes at least one robotic accessor 106/120 for transporting a specified sequential data storage medium between a storage slot disposed in storage wall 102/104 and data storage device 112 or 114. Accessors are moveably disposed along rail 108.

In the illustrated embodiment of FIG. 1A, host computer 130 comprises a storage management program ("SMP") 132. In certain embodiments, that storage management program, such as for example and without limitation the IBM Data Facility Storage Management Subsystem ("DFSMS") storage management program implemented in the IBM Multiple Virtual Storage ("MVS") operating system, manages the transfer of data to and from a data storage system, such system 100. In the illustrated embodiment of FIG. 1 host computer 130 further comprises a Tape Management System ("TMS") 134. In certain embodiments, the TMS is integral with the storage management program. In certain embodiments, the TMS comprises an IBM REMOVABLE MEDIA MANAGER program.

Figure 1B:
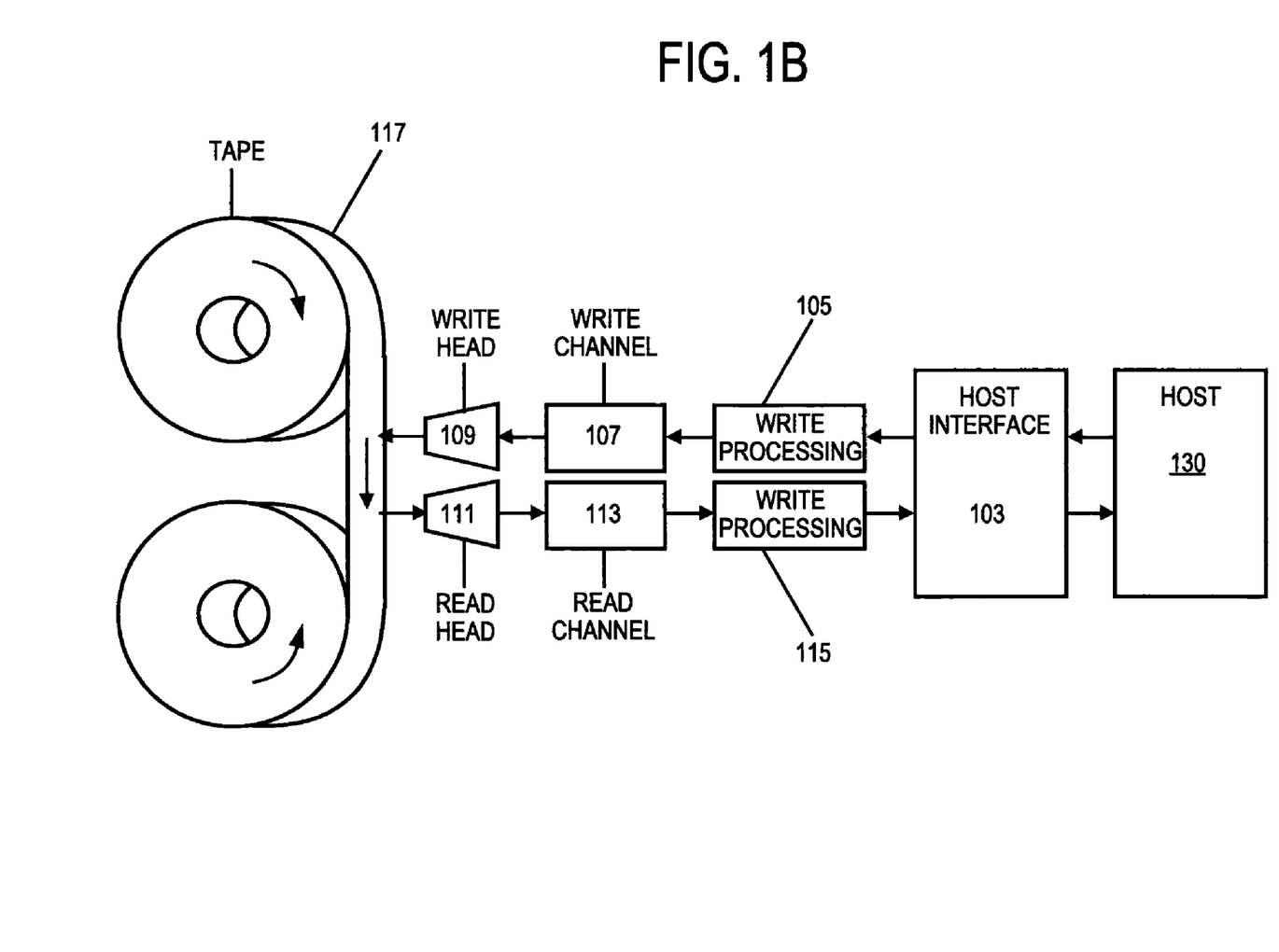
FIG. 1B is a block diagram of one embodiment of Applicants' data storage device in which the present invention may be implemented.

FIG. 1B is a block diagram showing certain elements of Applicants' data storage device, such as data storage devices 112 and 114 of FIG. 1A. In the illustrated embodiment of FIG. 1A, data storage devices 112 and 114 are in communication with host computer 130. In the illustrated embodiment of FIG. 1B, write processing module 105 and read processing module 115 are in communication with host computer 130 via host interface 103 through which data and commands are communicated. Data to be written is processed in a write processing module 105 and a write channel 107 before being written through write head 109 to a moving sequential data storage medium, such as tape 117. Data is read from tape 117 by read head 111 and processed by a read channel 113 and a read processing module 115 before being transmitted to the host computer 130 through the host interface 103.

Sequential data storage medium 117 comprises a plurality of parallel data tracks in combination with a plurality of servo patterns encoded in non-data portions of the storage medium. Those servo patterns are used to generate position error signals ("PES") to laterally position a read/write head with respect to the plurality of data tracks, and to determine a longitudinal position ("LPOS") along the length of the medium.

Figure 1C:
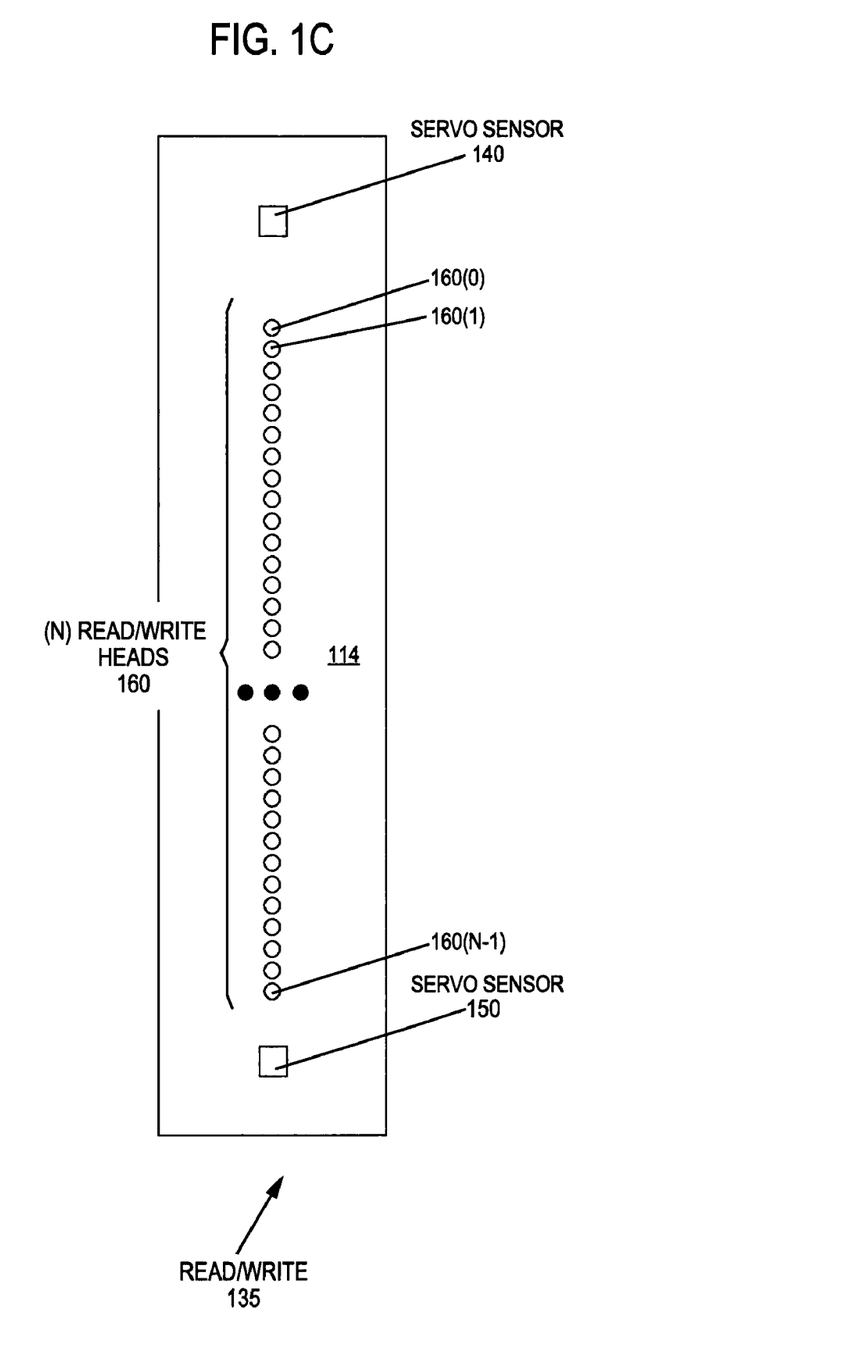
FIG. 1C illustrates elements of Applicants' read/write head.

Referring now to FIG. 1C, read/write head 135 consisting of write head 109 and read head 111 (FIG. 1B) comprises multiple elements to read data simultaneously from multiple data tracks. Read/write head 135 further comprises a number of servo elements to detect the servo signals from the servo bands. For example the read/write head may include two servo elements to detect the servo patterns on two servo bands between which are encoded parallel data tracks.

FIG. 1C illustrates surface 114 of a read/write head 135, wherein surface 114 has a facing relationship with sequential data storage medium 117 (FIG. 1B), as medium is moved across read/write head 135. In the illustrated embodiment of FIG. 1C, read/write head 135 comprises (N) read/write head elements (160). In certain embodiments, (N) is selected from the group consisting of 8, 16, 32, and 64. As those skilled in the art will appreciate, read/write head 135 may comprise additional elements not shown in FIG. 1C.

In the illustrated embodiment of FIG. 1C, read/write head 135 comprises servo sensor 140, servo sensor 150, and (N) read/write head elements 160 disposed between servo sensor 140 and servo sensor 150. As sequential tape medium 117 (FIG. 1B) is moved across read/write head 135, a read/write head lateral position is derived from the relative timings of pulses detected by servo sensor 140 and/or servo sensor 150.

Figure 2:
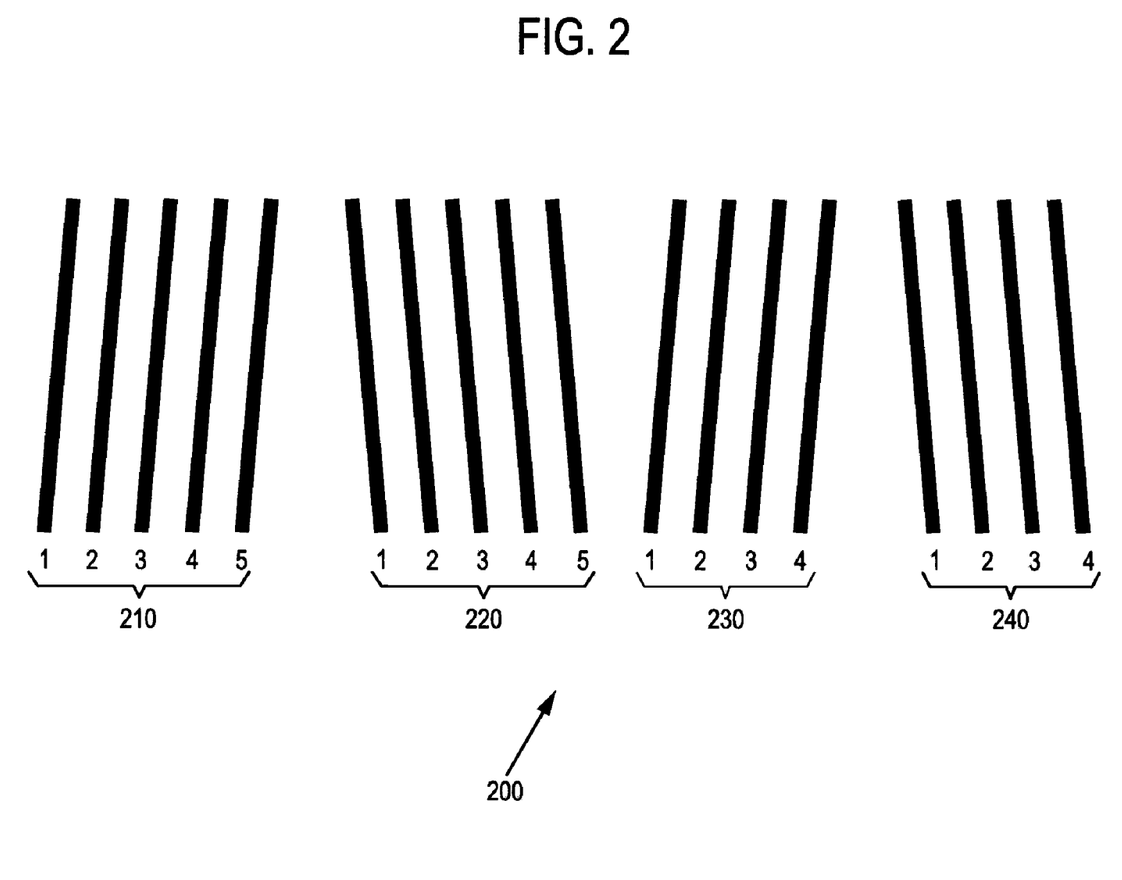
FIG. 2 illustrates one embodiment of Applicants' servo pattern comprising four bursts, wherein each of those four bursts comprises a plurality of pulses.

Referring to FIG. 2, servo pattern 200 comprises transitions comprising one of two different azimuthal slopes. Read/write head lateral position is derived from the relative timing of pulses detected by one or both servo sensors. Servo pattern 200 comprises a first burst 210 comprising five (5) pulses, wherein each of those five (5) pulses comprises a first azimuthal slope. Servo pattern 200 further comprises a second burst 220 comprising five (5) pulses, wherein each of those five (5) pulses comprises a second azimuthal slope. Servo pattern 200 further comprises a third burst 230 comprising four (4) pulses, wherein each of those four (4) pulses comprises the first azimuthal slope. Servo pattern 200 further comprises a fourth burst 240 comprising four (4) pulses, wherein each of those four (4) pulses comprises the second azimuthal slope.

The present invention provides a control scheme to identify the availability and status of the individual servo channels, and facilitates seamless switching between a single servo channel modes and a combined servo channel mode as the individual servo channels become active or inactive. In certain embodiments, Applicants' control scheme monitors the status of the two servo channels to provide the correct input to the weighted combining scheme. Applicants' control scheme comprises the components recited in FIG. 3 which implement the finite state machine of FIG. 4.

Figure 3:
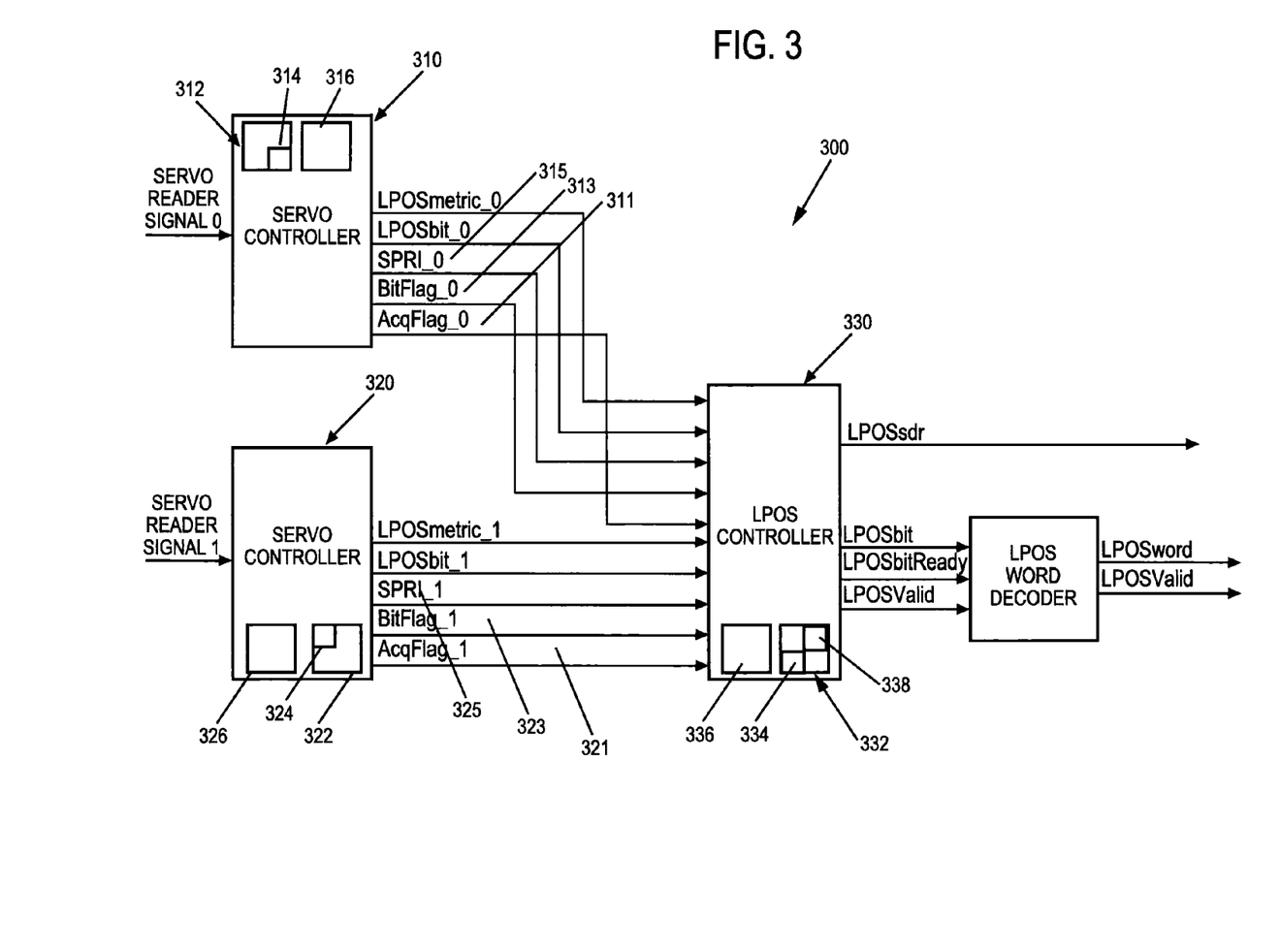
FIG. 3 is an block diagram illustrating certain elements of Applicants' data storage device.

Turning to FIG. 3, LPOS controller 330 receives the output of servo controller 310 and servo controller 320. In the illustrated embodiment of FIG. 3, LPOS controller 330 comprises processor 336 and memory 332 having instructions 334 and combining algorithm 338 encoded therein.

Further in the illustrated embodiment of FIG. 3, servo controller 310 comprises processor 316 and memory 312 having instructions 314 encoded therein. Further in the illustrated embodiment of FIG. 3, servo controller 320 comprises processor 326 and memory 322 having instructions 324 encoded therein.

Each servo controller can provide to LPOS controller 330 an acquisition flag 311/321, a bit flag 313/323, and a servo sensor position indicator ("SRPI") 315/325. The acquisition flag 311/321 indicates that a servo pattern has been acquired. If the acquisition flag is asserted, the servo channel is tracking a servo pattern and is providing frequent servo channel parameter updates (LPOS bit, reliability information, etc.).

The bit flag 313/323 indicates the availability of a new and valid LPOS bit and the associated reliability information at the end of each servo frame. A SRPI 315/325 indicates a current position of the servo-reader within a servo frame.

Acquisition flags 311/321, bit flags 313/323, and servo sensor position indicators ("SRPI") 315/325 are provided to LPOS controller 330. LPOS controller 330 implements a finite state machine ("FSM") having multiple intermediate states dependent upon a change in the status of the servo channels.

FIG. 4 illustrates Applicants' FSM 400. Applicants' FSM 400 comprises a finite number of states, transitions between those states, and actions. After reset, FSM 400 is placed in an initial idle state 0. In initial idle state 0 both servo channels, servo channel 0 and servo channel 1, are inactive. In certain embodiments, servo channel 0 comprises signals based upon servo signal detection by servo sensor 140 (FIG. 1C). In certain embodiments, servo channel 1 comprises signals based upon servo signal detection by servo sensor 150 (FIG. 1C).

When an acquisition flag is asserted for one or both servo channels, indicating that the associated servo channel(s) has become active and acquired a valid servo pattern, a transition is performed in the FSM into one of three intermediate states, 6, 7, or 10.

Intermediate state 6 is entered if acquisition flag 311 only is asserted, meaning servo channel 0 has become active but servo channel 1 remains inactive. Similarly, intermediate state 7 is entered if only acquisition flag 321 is asserted for servo channel 1, meaning servo channel 1 has become active while servo channel 0 remains inactive. Finally, intermediate state 10 is entered if acquisitions flag 311 and 321 are asserted for both servo channels, meaning both servo channel 0 and servo channel 1 are active. A transition from initial idle state 0 to intermediate state 10 indicates the absence of channel skew, i.e. that both servo channels simultaneously detect a valid servo pattern. This is likely to occur when the servo patterns encoded in both servo channels are aligned with each other.

FSM 400 will remain in an intermediate state 6, 7, or 10 until a bit flag is asserted and, or status of the servo channels changes. For example, if initially both servo channels become active at the same time and intermediate state 10 is entered, FSM 400 will remain in intermediate state 10 until a bit flag is received or until one of the servo channels becomes inactive. If, by way of example, servo channel 1 becomes inactive, FSM 400 will transition from intermediate state 10 to intermediate state 6. Again, FSM 400 will remain in intermediate state 6 until a change in servo channel status occurs or, as is subsequently discussed, a bit flag is received from the active servo channel, servo channel 0.

If FSM 400 is in either intermediate state 6 or intermediate state 7 and a second servo channel becomes active within a pre-determined time interval, FSM 400 transitions to intermediate state 10. Similarly, if FSM 400 is in either intermediate state 6 or intermediate 7 and the active servo channel becomes inactive, a transition to the initial idle state 0 is made.

If both servo channels are active, the FSM remains in state 10 until one of the servo channels asserts a bit flag, indicating the detection of a new LPOS bit. If both channels indicate the detection of a new LPOS bit simultaneously, combining state 14 is entered and the information from each servo channel can be utilized by LPOS combining algorithm 338 (FIG. 3).

Intermediate states 11 and 12 are entered from intermediate state 10 when a bit flag is asserted for only one of the servo channels when both servo channels are active. For example, if FSM 400 is in state 10 and bit flag 313 is asserted for servo channel 0, intermediate state 11 is entered. Likewise, if bit flag 323 is asserted for servo channel 1, intermediate state 12 is entered. FSM 400 remains in intermediate state 11 or 12 until a bit flag for the second servo channel is detected.

After the detection of the second new LPOS bit, the combining state 14 is entered and the information from each servo channel can be utilized by LPOS combining algorithm 338 (FIG. 3).

When the FSM 400 is in intermediate state 6 or 7, a bit flag cannot be detected from the inactive channel. Therefore, when a bit flag is detected for the active channel, FSM 400 transitions directly to combining state 14. In such a situation, LPOS combining algorithm 338 (FIG. 3) only uses LPOS bit information from the active servo channel.

After the LPOS combining algorithm 338 has been executed, the status of both servo channels is checked and the appropriate intermediate state is entered. If both servo channels are still active, FSM 400 transitions from the combining state 14 to intermediate state 10. If only one servo channel is active, the FSM 400 transitions from the combining state 14 to either state 6 or 7. Finally, if both channels are inactive, the FSM 400 transitions from the combining state 14 to initial state 0.

In certain embodiments, individual transitions recited in connection with FIG. 4 may be combined, eliminated, or reordered. In certain embodiments, instructions 334 (FIG. 3) are encoded in computer readable medium 332 (FIG. 3) wherein those instructions are executed by a processor 336 (FIG. 3) to implement FSM 400 (FIG. 4).

In other embodiments, the invention includes instructions residing in any other computer program product, where those instructions are executed by a computer external to, or internal to, a data storage system, to implement FSM 400. In either case, the instructions may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

The state transitions previously described in connection with FSM 400 may be repeated while the servo channels are being read. Thus, while the servo channels are being read, the system will continuously transition between the states of FSM 400 as acquisition flags and bit flags are detected.

By way of example, and not by way of limitation, a typical state sequence of the FSM if both servo channels are active and servo channel 0 is ahead of servo channel 1 is:

10→11→14→10→11→14→10 . . .

Another typical state sequence if both servo channels are active and servo channel 1 is ahead of servo channel 0 is:

10→12→14→10→12→14→10 . . .

If servo channel 0 is active and servo channel 1 is inactive, a typical state sequence is:

6→14→6→14→6 . . .

Another example of a typical state sequence where both servo channels are active, and new LPOS bit information is indicated by servo channel 0 before servo channel 1 becomes inactive is:

10→11→14→6→14→6→14→6 . . .

FSM 400 is designed such that it can operate in the presence of large time-varying skew between the two servo channels, without requiring explicit knowledge of the skew. In particular, the control scheme allows for a skew between the two servo channels of up to ±100 μm for standardized TBS patterns, or fifty (50) percent of the servo frame length.

Specifically, if the servo format and tape path layout guarantee that the skew is kept below fifty (50) percent of the servo frame length, servo channel alignment ambiguity is avoided without explicit knowledge of the skew. In FIG. 4, the critical phase for correct servo channel alignment is at the first transition to intermediate state 10 from intermediate state 6 or intermediate state 7. In this phase, one channel is already active, and the second channel becomes active. To align the information from the two channels correctly, the respective frame boundaries of the two servo channels are analyzed, where information regarding the frame boundaries is received from an SRPI for each channel.

Figure 5A:
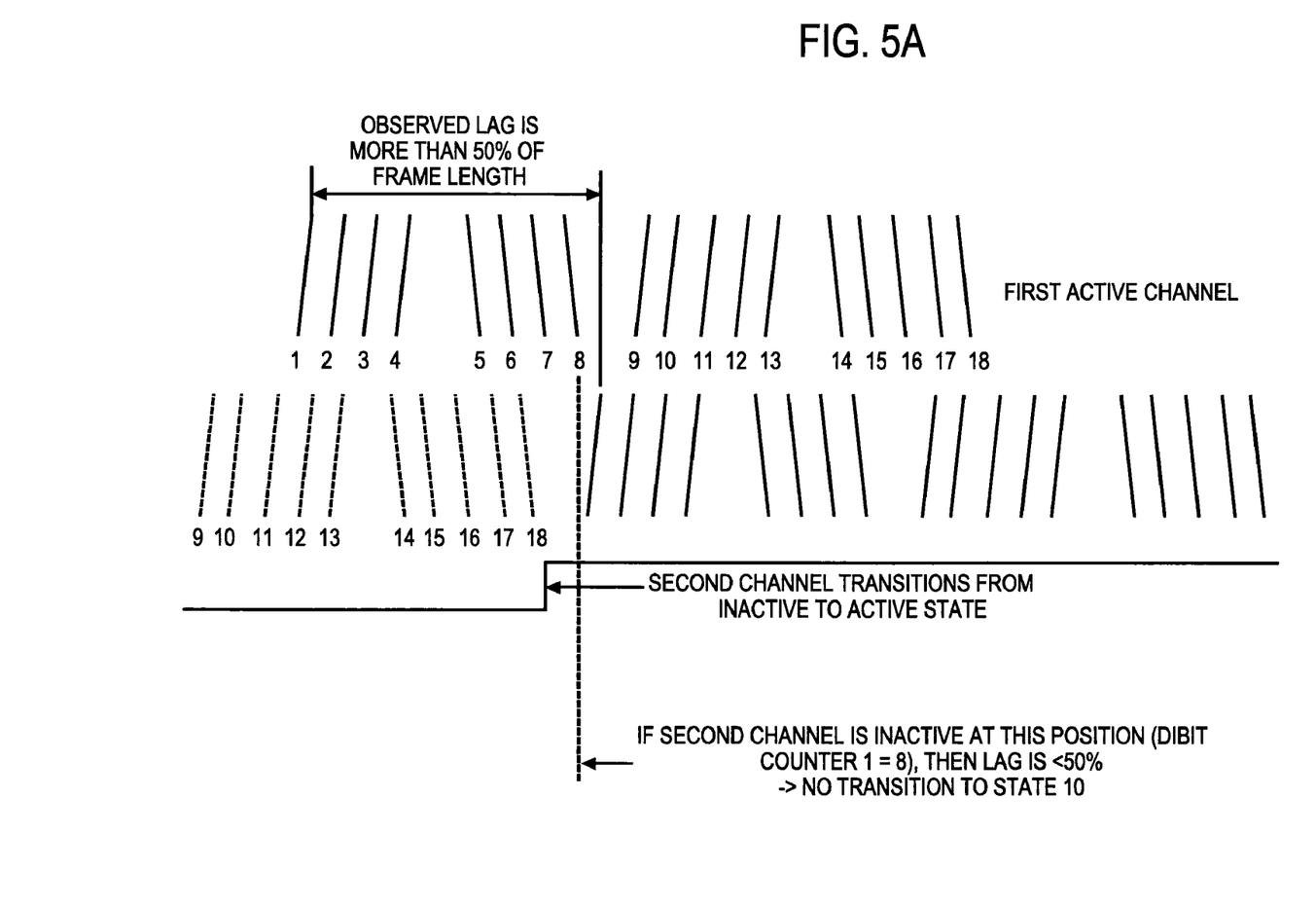
FIG. 5A illustrates an alignment of servo frames when the second servo channel lags behind the first servo channel by less than fifty (50) percent of the length of the servo frame.

As shown in FIG. 5A, if a second servo channel to become active lags behind the first servo channel by less than fifty (50) percent of the servo frame, a transition from intermediate state 6 or intermediate state 7 (FIG. 4) to intermediate state 10 (FIG. 4) occurs. Both channels are then used for LPOS bit detection. Alternatively, if the second servo channel lags behind the first servo channel by more than fifty (50) percent of the servo frame (i.e., the second servo channel is actually ahead of the first servo channel), no transition to intermediate state 10 (FIG. 4) is made for the current servo frame.

Figure 5B:
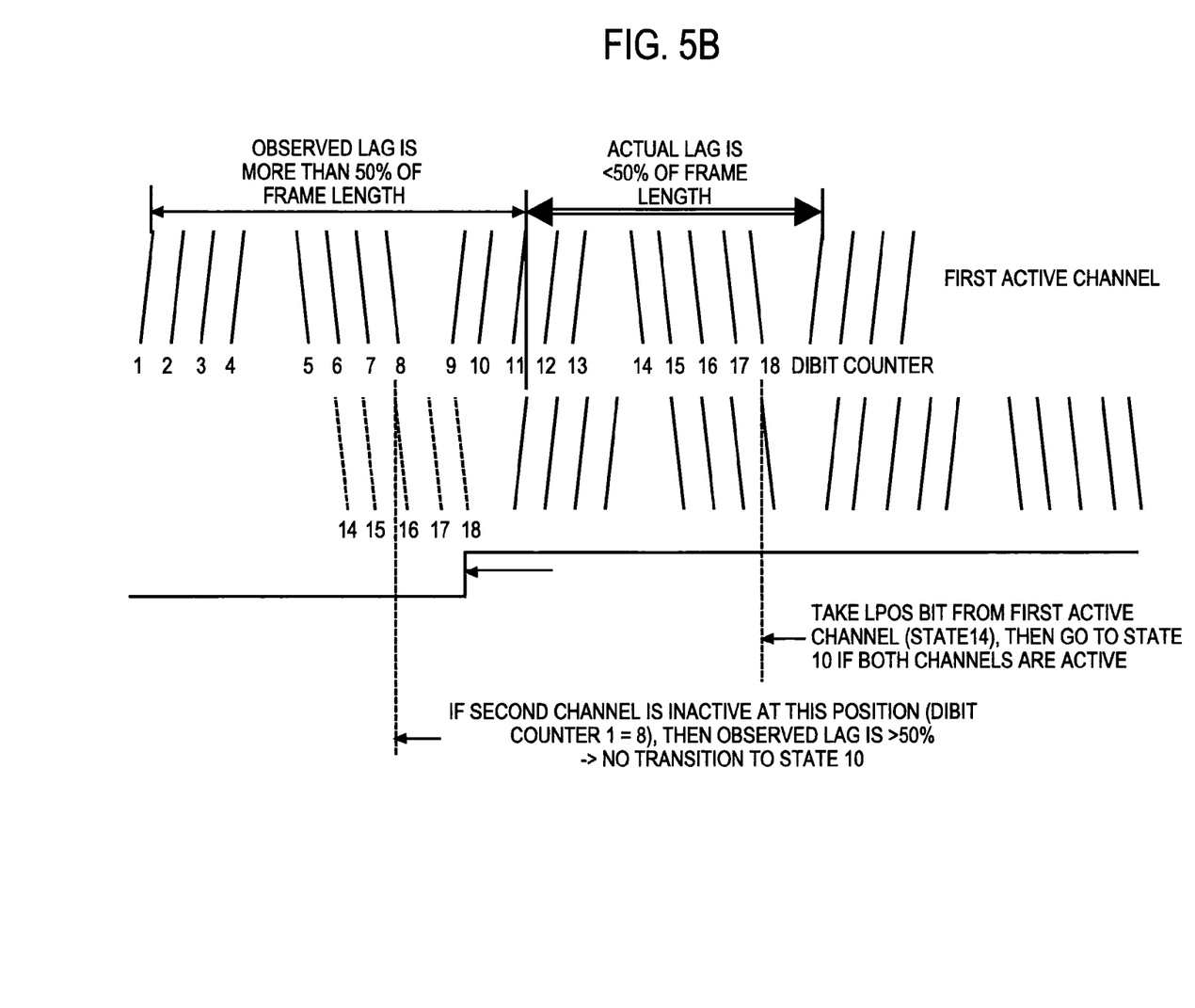
FIG. 5B illustrates an alignment of servo frames when the second servo channel lags behind the first servo channel by more than fifty (50) percent of the length of the servo frame.

Rather, a transition from intermediate state 6 (FIG. 4) or intermediate state 7 (FIG. 4) to combining state 14 is carried out as soon as a bit flag from the first active servo channel is detected, i.e. new LPOS bit information is available for the first active servo channel. This latter scenario is illustrated in FIG. 5B.

As discussed in reference to FIG. 4, when leaving combining state 14, the system transitions to intermediate state 10 if both servo channels are still active. Alternatively, a transition to intermediate state 6 or intermediate state 7 is made if only one servo channel remains active. With this approach, the correct alignment of both servo channels can be guaranteed for skew values of less than fifty (50) percent of the servo frame length.

In one embodiment, a dibit counter is used to determine the skew between the two servo channels. A servo channel can change state from inactive to active only at the end of a servo frame, i.e., after detecting eighteen (18) sequential dibits in bursts of 4, 4, 5, 5 dibits. In certain embodiments, the state of an inactive servo channel is checked after detecting fifty (50) percent of the frame length of the active servo channel. This position coincides with the detection of the 8th dibit in a servo frame, or a dibit counter value of 8. If, at this position, the status of the second servo channel is active then, as discussed in reference to FIG. 5A, the second servo channel is lagging behind the first servo channel by less than fifty (50) percent of the servo frame length, and a transition to state 10 (FIG. 4) is performed.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of monitoring a plurality of servo channels disposed in a data storage device, comprising:

moving a sequential information storage medium comprising a plurality of servo patterns across a read/write head comprising a corresponding plurality of servo sensors, wherein said read/write head is disposed in said data storage device, and wherein said data storage device comprises a first servo channel, a second servo channel, and a finite state machine ("FSM") comprising a single servo channel mode, a combined servo channel mode, an initial state wherein both servo channels are idle, a plurality of intermediate states wherein one servo channel is active and the other servo channel is idle, and a combining state wherein both servo channels are active;

when either the first servo channel or the second servo channel is tracking a servo pattern, asserting an acquisition flag for the servo channel tracking the servo pattern;

when a longitudinal position "LPOS" bit is decoded by either the first servo channel or the second servo channel, asserting a bit flag for the servo channel that decoded the LPOS bit; and when an acquisition flag and a bit flag are asserted for the same servo channel, determining a relative positioning of each servo sensor with respect to an associated servo pattern.

2. The method of claim 1, further comprising:

when not detecting an acquisition flag asserted for either servo channel, placing said FSM in an initial state;

when detecting an acquisition flag asserted for said first or second servo channel while not detecting an acquisition flag asserted by said second or first servo channel, respectively, transitioning from said initial state to a first FSM intermediate state;

when detecting a bit flag asserted for said first or second servo channel, transitioning from said first FSM intermediate state to a FSM combining state;

utilizing LPOS information provided by said first or second servo channel only.

3. The method of claim 2, further comprising:

when detecting acquisition flags asserted for both said first servo channel and said second servo channel, transitioning from said initial state to a second FSM intermediate state;

when detecting bit flags asserted for both said first servo channel and said second servo channel, transitioning from said second FSM intermediate state to said FSM combining state;

utilizing LPOS information provided by both said first servo channel and said second servo channel.

4. The method of claim 1, further comprising determining a skew between the first servo channel and the second servo channel.

5. The method of claim 4, wherein each of said servo channels comprises a plurality of sequential servo frames, each servo frame comprising a plurality of servo dibits, wherein the method further comprises:
  establishing a first dibit count for said first servo channel;
  establishing a second dibit count for said second servo channel; and
  calculating the skew by subtracting the first dibit count from the second dibit count.

6. An article of manufacture comprising a computer readable medium, computer readable program code to monitor a plurality of servo channels encoded in said computer readable medium, a finite state machine ("FSM") encoded in said computer readable medium, wherein said FSM comprises a single servo channel mode, a combined servo channel mode, an initial state wherein both a first servo channel and a second servo channel are idle, a plurality of intermediate states wherein one servo channel is active and the other servo channel is idle, and a combining state wherein both servo channels are active, wherein the computer readable medium is selected from the group consisting of a magnetic information storage medium, an optical information storage medium, and an electronic information storage medium, the computer readable program code comprising a series of computer readable program steps to effect:
  moving a sequential information storage medium comprising a plurality of servo patterns across a read/write head comprising a corresponding plurality of servo sensors, wherein said read/write head is disposed in a data storage device, and wherein said data storage device comprises said first servo channel and said second servo channel;
  when either the first servo channel or the second servo channel is tracking a servo pattern, asserting an acquisition flag for the servo channel tracking the servo pattern;
  when a longitudinal position ("LPOS") bit is decoded by either the first servo channel or the second servo channel, asserting a bit flag for the servo channel that decoded the LPOS bit; and
  when an acquisition flag and a bit flag are asserted for the same servo channel, determining a relative positioning of each servo sensor with respect to an associated servo pattern.

7. The article of manufacture of claim 6, wherein said computer readable program code further comprises a series of computer readable program steps to effect:
  when not detecting an acquisition flag asserted for either servo channel, placing said FSM in an initial state;
  when detecting an acquisition flag asserted for said first or second servo channel while not detecting an acquisition flag asserted for said second or first servo channel, respectively, transitioning from said initial state to a first FSM intermediate state;
  when detecting a bit flag asserted for said first or second servo channel, transitioning from said first FSM intermediate state to a FSM combining state;
  utilizing LPOS information provided by said first or second servo channel only.

8. The article of manufacture of claim 7, wherein said computer readable program code further comprises a series of computer readable program steps to effect:
  when not detecting an acquisition flag asserted by either servo channel, placing said FSM in an initial state;
  when detecting acquisition flags asserted for both said first servo channel and said second servo channel, transitioning from said initial state to a second FSM intermediate state;
  when detecting bit flags asserted for both said first servo channel and said second servo channel, transitioning from said second FSM intermediate state to said FSM combining state;
  utilizing LPOS information provided by both said first servo channel and said second servo channel.

9. The article of manufacture of claim 8, wherein said computer readable program code further comprises a series of computer readable program steps to effect determining a skew between the first servo channel and the second servo channel.

10. The article of manufacture of claim 9, wherein each of said servo channels comprises a plurality of sequential servo frames, each servo frame comprising a plurality of servo dibits, wherein said computer readable program code further comprises a series of computer readable program steps to effect:
  establishing a first dibit count for said first servo channel;
  establishing a second dibit count for said second servo channel; and
  calculating the skew by subtracting the first dibit count from the second dibit count.

11. A computer program product encoded in a computer readable medium and useable with a programmable computer processor to monitor a plurality of servo channels, wherein a finite state machine ("FSM") comprises a single servo channel mode, a combined servo channel mode, an initial state wherein both a first servo channel and a second servo channel are idle, a plurality of intermediate states wherein one servo channel is active and the other servo channel is idle, and a combining state wherein both servo channels are active, and wherein the computer readable medium is selected from the group consisting of a magnetic information storage medium, an optical information storage medium, and an electronic information storage medium, the computer program product comprising:
  computer readable program code which causes said programmable processor to move a sequential information storage medium comprising a plurality of servo patterns across a read/write head comprising a corresponding plurality of servo sensors, wherein said read/write head is disposed in a data storage device, and wherein said data storage device comprises said first servo channel and said second servo channel;
  computer readable program code which, when either the first servo channel or the second servo channel is tracking a servo pattern, causes said programmable processor to assert an acquisition flag for the servo channel tracking the servo pattern;
  computer readable program code which, when a longitudinal position ("LPOS") bit is decoded by either the first servo channel or the second servo channel, causes said programmable processor to assert a bit flag for the servo channel that decoded the LPOS bit; and
  computer readable program code which, when an acquisition flag and a bit flag are asserted for the same servo channel, causes said programmable processor to determine a relative positioning of each servo sensor with respect to an associated servo pattern.

12. The computer program product of claim 11, further comprising:
- computer readable program code which, when not detecting an acquisition flag asserted for either servo channel, causes said programmable processor to place said FSM in an initial state;
- computer readable program code which, when detecting an acquisition flag asserted for said first or second servo channel while not detecting an acquisition flag asserted for said second or first servo channel, causes said programmable processor to transition from said initial state to a first FSM intermediate state;
- computer readable program code which, when detecting a bit flag asserted for said first or second servo channel, respectively, causes said programmable processor to transition from said first FSM intermediate state to a FSM combining state;
- computer readable program code which causes said programmable processor to utilize LPOS information provided by said first or second servo channel only.

13. The computer program product of claim 12, further comprising:
- computer readable program code which, when detecting acquisition flags asserted for both said first servo channel and said second servo channel, causes said programmable processor to transition from said initial state to a second FSM intermediate state;
- computer readable program code which, when detecting bit flags asserted for both said first servo channel and said second servo channel, causes said programmable processor to transition from said second FSM intermediate state to a FSM combining state;
- computer readable program code which causes said programmable processor to utilize LPOS information provided by both said first servo channel and said second servo channel.

14. The computer program product of claim 13, further comprising:
- computer readable program code which causes said programmable processor to determine a skew between the first servo channel and the second servo channel.

15. The computer program product of claim 14, wherein each of said servo channels comprises a plurality of sequential servo frames, each servo frame comprising a plurality of servo dibits, wherein the computer program product further comprises:
- computer readable program code which causes said programmable processor to establish a first dibit count for said first servo channel;
- computer readable program code which causes said programmable processor to establish a second dibit count for said second servo channel; and
- computer readable program code which causes said programmable processor to calculate the skew by subtracting the first dibit count from the second dibit count.

16. A data storage device comprising:
a first servo sensor, a second servo sensor, a first servo controller in communication with said first servo sensor and with a finite state machine ("FSM") comprising a single servo channel mode, a combined servo channel mode, an initial state wherein both a first servo channel and a second servo channel are idle, a plurality of intermediate states wherein one servo channel is active and the other servo channel is idle, and a combining state wherein both servo channels are active, and a second servo controller in communication with said second servo sensor and with said FSM;

wherein:
said first servo controller comprises a first acquisition flag indicating said first servo channel has acquired a servo pattern, a first bit flag indicating the availability of a longitudinal position ("LPOS") bit, and a first servo sensor position indicator ("SRPI") providing a position of said first servo sensor with respect to a servo frame encoded in said first servo channel;
said second servo controller comprises a second acquisition flag indicating said second servo channel has acquired a servo pattern, a second bit flag indicating the availability of a LPOS bit, and a second servo sensor position indicator ("SRPI") providing a position of said second servo sensor with respect to a servo frame encoded in said second servo channel.

17. The data storage device of claim 16, further comprising an LPOS controller comprising an LPOS combining algorithm, wherein said LPOS controller is in communication with said first servo controller and said second servo controller.

18. The data storage device of claim 16, wherein:
said first servo channel comprises a first servo sensor;
said second servo channel comprises a second servo sensor;
said first servo sensor detects a plurality of first sequential servo frames, each first servo frame comprising a plurality of first servo dibits;
said second servo sensor detects a plurality of second sequential servo frames, each second servo frame comprising a plurality of second servo dibits;
said first SRPI is a dibit counter for said plurality of first servo dibits; and
said second SRPI is a dibit counter for said plurality of second servo dibits.

19. A data storage library comprising:
a plurality of data storage devices, wherein each data storage device comprises a first servo sensor, a second servo sensor, a first servo controller in communication with said first servo sensor and with a finite state machine ("FSM") comprising a single servo channel mode, a combined servo channel mode, an initial state wherein both a first servo channel and a second servo channel are idle, a plurality of intermediate states wherein one servo channel is active and the other servo channel is idle, and a combining state wherein both servo channels are active, and a second servo controller in communication with said second servo sensor and with said FSM, wherein:
said first servo controller comprises a first acquisition flag indicating said first servo channel has acquired a servo pattern, a first bit flag indicating the availability of a longitudinal position ("LPOS") bit, and a first servo sensor position indicator ("SRPI") providing a position of said first servo sensor with respect to a servo frame encoded in said first servo channel;
said second servo controller comprises a second acquisition flag indicating said second servo channel has acquired a servo pattern, a second bit flag indicating the availability of a LPOS bit, and a second servo sensor position indicator ("SRPI") providing a position of said second servo sensor with respect to a servo frame encoded in said second servo channel.

20. The data storage library of claim 19, further comprising an LPOS controller comprising an LPOS combining algorithm, wherein said LPOS controller is in communication with said first servo controller and said second servo controller.

21. The data storage library of claim 20, wherein:

said first servo channel comprises a first servo sensor;

said second servo channel comprises a second servo sensor;

said first servo sensor detects a plurality of first sequential servo frames, each first servo frame comprising a plurality of first servo dibits;

said second servo sensor detects a plurality of second sequential servo frames, each second servo frame comprising a plurality of second servo dibits;

said first SRPI is a dibit counter for said plurality of first servo dibits; and said second SRPI is a dibit counter for said plurality of second servo dibit.

\* \* \* \* \*